(12) United States Patent
Odeberg et al.

(10) Patent No.: US 7,992,519 B2
(45) Date of Patent: Aug. 9, 2011

(54) ARRANGEMENT AND METHOD IN A MILKING SYSTEM

(75) Inventors: Johan Odeberg, Stockholm (SE); Otto Hellekant, Rönninge (SE); Raza Mehinovic, Tumba (SE); Magnus Storbjörk, Vårsta (SE); Louise Kullgren, Flen (SE); Torbjörn Petterson, Gnesta (SE); Christoffer Hägglund, Tumba (SE); Stefan Irhsén, Strängnäs (SE); Helmut Obermüller, Stockholm (SE); Robert Jonsson, Stockholm (SE); Souren Kerikorian, Hässelby (SE); Gary Aldgård, Segeltorp (SE); Gösta Forsén, Tullinge (SE)

(73) Assignee: Delaval Holding AB, Tumba (SE)

( * ) Notice: Subject to any disclaimer, the term of this patent is extended or adjusted under 35 U.S.C. 154(b) by 277 days.

(21) Appl. No.: 12/311,469

(22) PCT Filed: Sep. 17, 2007

(86) PCT No.: PCT/SE2007/000809
§ 371 (c)(1),
(2), (4) Date: May 7, 2009

(87) PCT Pub. No.: WO2008/051134
PCT Pub. Date: May 2, 2008

(65) Prior Publication Data
US 2009/0260574 A1    Oct. 22, 2009

(30) Foreign Application Priority Data
Oct. 23, 2006  (SE) ........................... 0602219

(51) Int. Cl.
*A01J 3/00*   (2006.01)
(52) U.S. Cl. .................. 119/14.02; 119/14.08

(58) Field of Classification Search ............... 119/14.02, 119/14.08, 14.14, 14.15, 14.17, 14.03
See application file for complete search history.

(56) References Cited

U.S. PATENT DOCUMENTS

| 3,536,045 | A | | 10/1970 | Flocchini | |
| 4,756,274 | A | * | 7/1988 | Rubino | 119/14.08 |
| 6,796,271 | B2 | * | 9/2004 | van den Berg | 119/14.43 |
| 2002/0148408 | A1 | * | 10/2002 | Gompper et al. | 119/14.14 |
| 2003/0151389 | A1 | * | 8/2003 | Cummings | 320/122 |
| 2006/0254523 | A1 | * | 11/2006 | Guo | 119/14.03 |
| 2008/0184936 | A1 | * | 8/2008 | Petterson et al. | 119/14.02 |
| 2009/0165725 | A1 | * | 7/2009 | Kaever et al. | 119/14.02 |

FOREIGN PATENT DOCUMENTS

| EP | 0 636 313 | 3/1999 |
| EP | 0 900 522 | 3/1999 |
| WO | WO 02/07505 | 1/2002 |
| WO | WO 2006/068568 | 6/2006 |

* cited by examiner

*Primary Examiner* — Kimberly S Smith
*Assistant Examiner* — Joshua Huson
(74) *Attorney, Agent, or Firm* — Harness, Dickey & Pierce, P.L.C.

(57) ABSTRACT

An arrangement is provided in a milking system for simultaneous milking of a plurality of milking animals, wherein the milking system comprises a plurality of milking positions (P1-P24) and an arrangement for establishing identities of and expected milking times for the milking animals. Each of the milking positions is provided with teat cups, which are attached to the teats of a milking animal and are connected to a source of vacuum to milk the milking animal. The inventive arrangement comprises means (10) for determining a milking position, at which the milking animal having the longest expected milking time is present, based on the established identities and expected milking times; and a device (11, 13, 17; 20) for performing an action with respect to the milking system in response to the determination.

8 Claims, 4 Drawing Sheets

ARRANGEMENT AND METHOD IN A MILKING SYSTEM

TECHNICAL FIELD OF THE INVENTION

The present invention generally relates to the field of dairy farming and more specifically the invention relates to arrangements and methods according to the preambles of the appended independent claims.

DESCRIPTION OF RELATED ART

Milking systems for simultaneously milking a plurality of milking animals are known in the art. Such milking systems comprise a plurality of milking positions, wherein each of the milking positions is provided with teat cups, which are attached to the teats of a milking animal and connected to a source of vacuum to milk the milking animal. Typically, an arrangement is provided for establishing identities of, and expected milking times for, the milking animals present at the milking positions. The milking systems may e.g. be of Herringbone or parallel stall type.

In one such milking system the milking animals are allowed to enter the milking positions in a group and are identified. Then, the dairy farmer walks from milking position to milking position and attaches teat cups manually to the teats of the milking animals present at the milking positions in a consecutive order. Milking is started at a milking position when the teat cups have been attached to the milking animal present at the milking position. The milking animals are allowed to leave the milking positions in a group when all milking animals have been milked.

In such milking system there may be provided terminal units connected to an information gathering and control device of the milking system. The terminal units may display information of different actions to be taken, they may provide monitoring and status information of the progress of the milking, and they may give alarms of different kinds. Further, the terminal units may be used for initiating some actions and for correcting erroneous information. In a modern milking system there are obviously a large number of actions to be taken, tasks to be performed, and processes to be monitored by the dairy farmer.

SUMMARY OF THE INVENTION

A problem of the above milking system, wherein the dairy farmer walks from milking position to milking position and attaches teat cups to the teats of the milking animals present at the milking positions in a consecutive order, is that the throughput of the milking system is not optimized. Since the milking animals have entered the milking positions in some arbitrary order maybe teat cups are attached to milking animals, which have short expected milking times in an early phase of the teat cup attachment procedure, while teat cups are attached to milking animals, which have long expected milking times, in a late phase of the teat cup attachment procedure. As a consequence thereof and provided that the milking animals enter and leave the milking positions group wise, the period of time the animals are at the milking positions is unnecessary long. This obviously limits the throughput of the milking system.

It is an object of the present invention to address and solve the above identified problem.

Arrangements and methods as claimed in claims 1-8 are provided to attain the above object.

According to one aspect of the invention there is provided an arrangement in a milking system for simultaneous milking of a plurality of milking animals, wherein the milking system comprises a plurality of milking positions and an arrangement for establishing identities of and expected milking times for the milking animals. Each of the milking positions is provided with teat cups, which are attached to the teats of a milking animal and are connected to a source of vacuum to milk the milking animal. The arrangement in the milking system comprises means for determining a milking position, at which the milking animal having the longest expected milking time is, present, based on the established identities and expected milking times; and a device for performing an action with respect to the milking system in response to the determination.

Preferably, the determining means determines several milking positions, at which the milking animals having the longest expected milking times are present, based on the established identities and expected milking times, and the device for performing an action performs an action with respect to the milking system in response to the determination of the several milking positions.

In one embodiment the device for performing an action is an output arrangement for outputting, prior to the teat cups are attached to the teats of the milking animals present at the milking positions, an indication of the milking position(s), at which the milking animal(s) having the longest expected milking time(s) is/are present. Thereby, the dairy farmer is allowed to have the teat cups attached to, and to start milking, the milking animal(s) having the longest expected milking time(s) first.

In a particular version of the above embodiment the output arrangement comprises an output device located at each of the milking positions, where each of the output devices indicates, e.g. visually, whether the milking animal present at the milking position, at which the output device is located, belongs to the milking animal(s) having the longest expected milking time(s).

In another embodiment the device for performing an action is a robot arm arrangement for attaching teat cups to the teats of the animal(s) having the longest expected milking time(s) first, to thereby enable for the milking system to start milking the milking animal(s) having the longest expected milking time(s) first.

In yet another embodiment the determining means is provided for calculating an order, in which the milking animals present at the milking positions should have teat cups attached to their teats, based on the established identities and expected milking times.

According to a further aspect of the invention there is provided a method for using the arrangement as identified above.

By means of the above aspects of the invention the overall milk production by the milking system is increased. Since the period of time the milking animals have to be at the milking positions is decreased, the milking capacity of the milking system is more rapidly freed to be used for the milking of a further group of unmilked milking animals.

BRIEF DESCRIPTION OF THE DRAWINGS

Figures 6, 7:
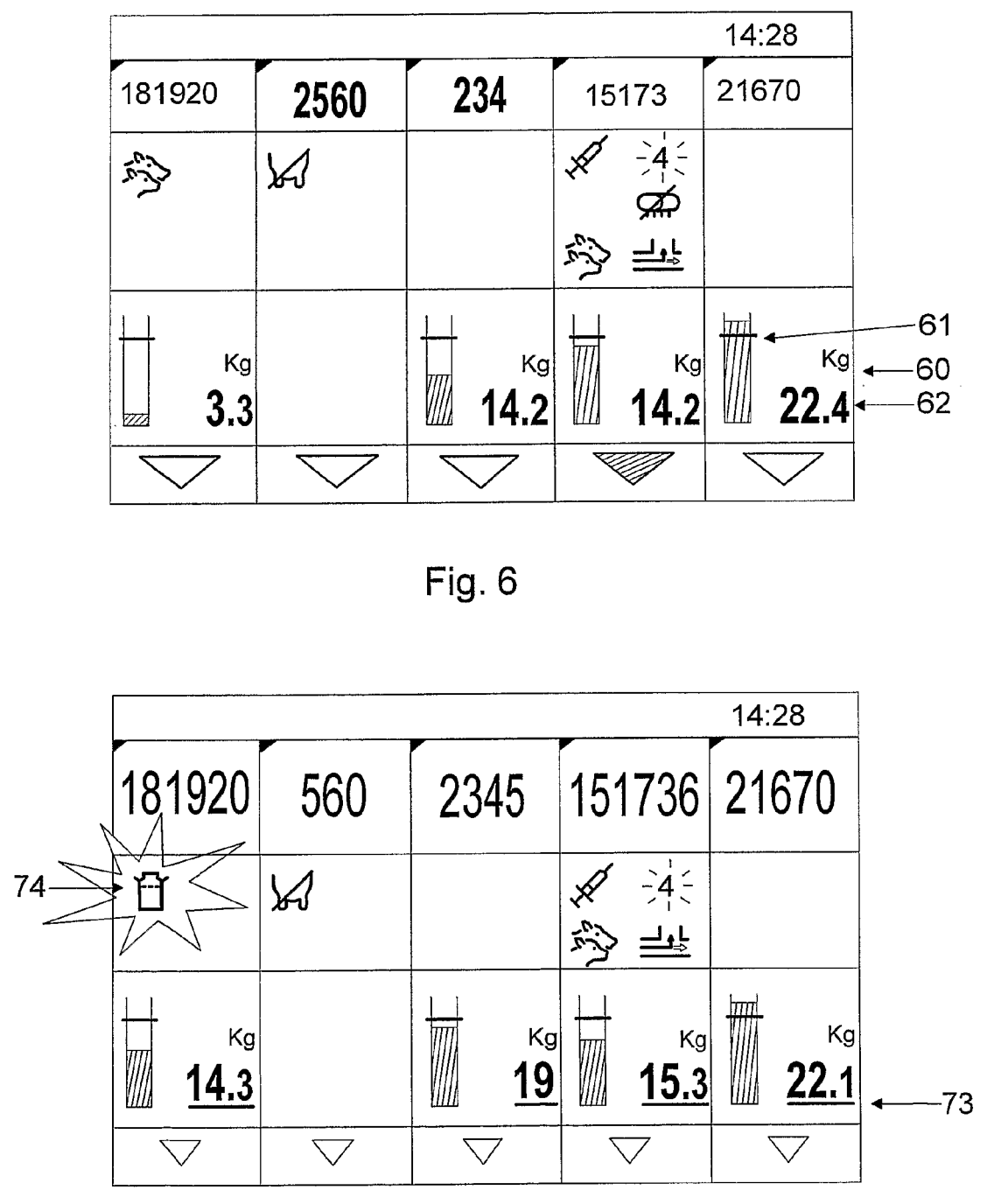

FIGS. 4-7 are schematic views of a terminal unit of a second kind in different modes as being included in the inventive arrangement of FIG. 1.

In the detailed description the milk producing animals are referred to as cows. However, the invention is not limited to cows, but is applicable to any animals having the capability to produce large quantities of milk, such as sheep, goats, buffaloes, horses, etc.

DETAILED DESCRIPTION OF THE EMBODIMENTS

Figure 1:
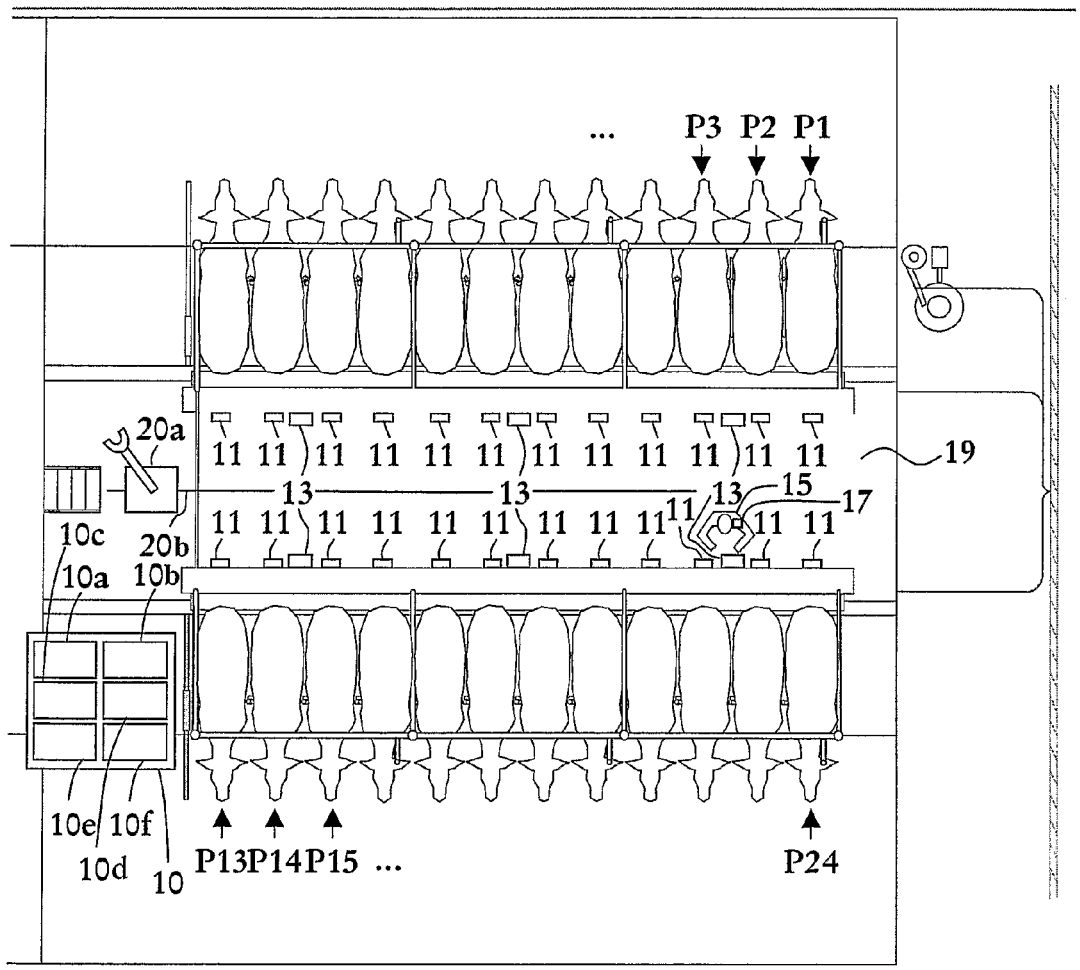
FIG. 1 is a schematic top view of a parallel stall milking system including an arrangement according to an embodiment of the present invention.

FIG. 1 shows a schematic top view of a parallel stall milking system including an arrangement according to an embodiment of the present invention. The parallel milking stall system may be exchanged for any other kind of milking system wherein a plurality of cows are milked simultaneously such as for example a Herringbone type of milking system. The parallel milking stall system comprises a plurality of milking positions, in the illustrated case 24 milking positions P1-P24. In such a milking system cows enter into, are milked in, and leave, the respective milking positions in groups.

The milking system comprises an arrangement for establishing identities of the cows (not explicitly illustrated), which forward the established identities to a computer-based processing and control device 10, which is responsible for processing and controlling of the milking system. The processing and control device 10 comprises typically a microcomputer, suitable software, and a database including information of each of the cows milked by the milking robot, such as e.g. when the respective cow was milked last time, when the cow was fed last time, the milk production of the cow, the health of the cow, the expected milking time of the cow, etc.

Each of the milking positions P1-P24 comprises teat cups that are attached to the teats of a cow and are connected to a source of vacuum to milk the cow (none of which being explicitly illustrated) as being common in the field.

Further, the milking system comprises, for each of the milking positions P1-P24, a terminal unit 11 of a first kind arranged at the milking position P1-P24, connected to the processing and control device 10, and provided for displaying information of a first kind of the milking position to a dairy farmer or other operator 15. For each group P1-P4; P5-P8, . . . of adjacent milking positions P1-P24, a terminal unit 13 of a second kind is arranged at the group of adjacent milking positions, connected to the information processing and control device 10, and provided for displaying information of a second, preferably more detailed, kind of the group of adjacent milking positions P1-P24 to the operator 15. The group may consist of other number of milking positions than four, such as e.g. 3-7 milking positions.

The information of the first kind may i.a. comprise information of (i) when further information is obtainable from the terminal units 13 of the second kind, (ii) when the milking position is closed for milking, (iii) when the milk milked at the milking position is diverted, (iv) when the milking position is being cleaned, (v) when vacuum is applied, and (vi) when a milk flow is present. The information of the second kind may i.a. comprise information of (i) verified, unverified, and missing identities of cows present at milking positions, (ii) various reminders supporting the operator during different phases of the milking, (iii) milk flows and/or yields during milking, (iv) expected remaining milking times, (v) termination of milking of the cows, and (vi) milk yields obtained for the cows.

The terminal units 11, 13 may also be used as input devices for altering information and/or for controlling different processes with respect to the milking. For instance, the terminal units 11 of the first kind may be used for turning on and off vacuum to the teat cups of the respective milking positions, whereas the terminal units 13 of the second kind may be used for controlling the feeding of the cows present at the respective milking positions, for controlling automatic gates of the milking system, for controlling a robot arm, for switching the respective milking positions between milking and cleaning modes, and for controlling the cleaning of the milking equipment.

Further, a portable device 17 including outputting means, such as e.g. loudspeaker, earphone, or earpiece device, to be held or worn by the operator 15 of the milking system is provided. The portable device comprises a receiver for receiving information wirelessly from the processing and control device 10, and for communicating such information verbally to the operator 15. To this end, the processing and control device 10 comprises a transmitter for transmitting information wirelessly.

The portable device 17 may alternatively or additionally include outputting means for visual output.

Figure 2:
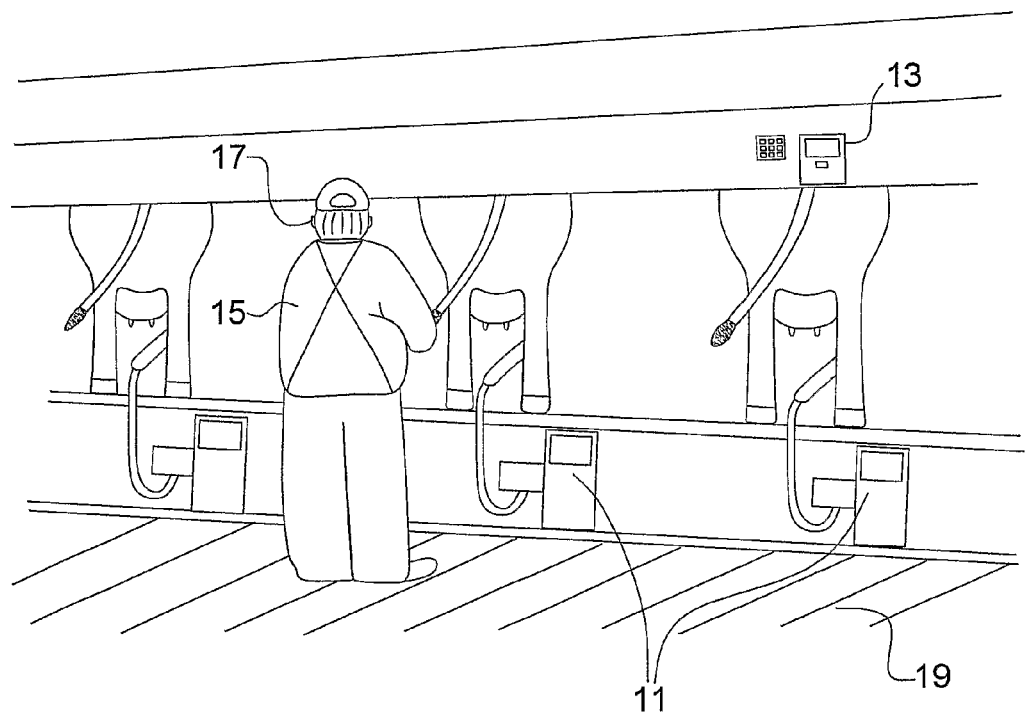
FIG. 2 is a schematic perspective view of part of the milking system of FIG. 1.

In FIG. 2, a schematic perspective view of part of the milking system of FIG. 1 is shown. A vertically adjustable floor 19 is provided, on which the operator 15 of the milking system may stand while performing various actions including the attachment of the teat cups to the teats of the cows present at the milking positions P1-P24.

The processing and control device 10 may be provided for determining a milking position, at which the cow having the longest expected milking time is present, based on established identities and expected milking times for the cows present at the milking positions P1-P24.

The terminal devices 11 of the first kind are provided for outputting to the operator 15 prior to the teat cups are attached to the teats of the cows present at the milking positions P1-P24 indications of the milking position at which the cow having the longest expected milking time is present, to thereby allow for the operator 15 to have the teat cups attached to, and to start milking, the cow having the longest expected milking time first.

The processing and control device 10 may be provided for determining several milking positions, at which the cows having the longest expected milking times are present, based on established identities and expected milking times for the cows.

The number of milking positions may be dependent on the distribution of expected milking times among the cows present at the milking positions P1-P24. For instance, if there are a large number of cows present at the milking positions P1-P24 having very long expected milking time, the number of milking positions may be set to this large number. If there is a single cow having much longer expected milking time than the other cows, the number of milking positions may be set to one.

The number may also be dependent on the locations of the milking positions, at which the cows having the longest expected milking times are present. If a cow having a rather long expected milking time stands in a milking position adjacent a milking position housing a cow with very long expected milking time, both milking positions may be considered by the processing and control device 10 as belonging to the several milking positions.

If the milking system is provided with a robot 20a movable along e.g. a rail 20b and provided for automatically attaching teat cups to the teats of the cows present at the milking positions P1-P24, the above outputting may be exchanged for an automatic is teat cup attachment procedure, wherein the robot 20a is provided for automatically attaching teat cups to the teats of the cow having longest expected milking time first.

In a generalized version, means are provided for performing an action with respect to the milking system in response to the determination of the milking position, at which the cow having the longest expected milking time is present.

In an alternative embodiment the processing and control device 10 is provided for calculating an order, in which the cows present at the milking positions should have teat cups attached to their teats, based on the established identities and expected milking times. Such calculated order is communicated to the operator 15 or the robot 20a is provided for attaching teat cups to the teats of the cows in such calculated order.

Figure 3:
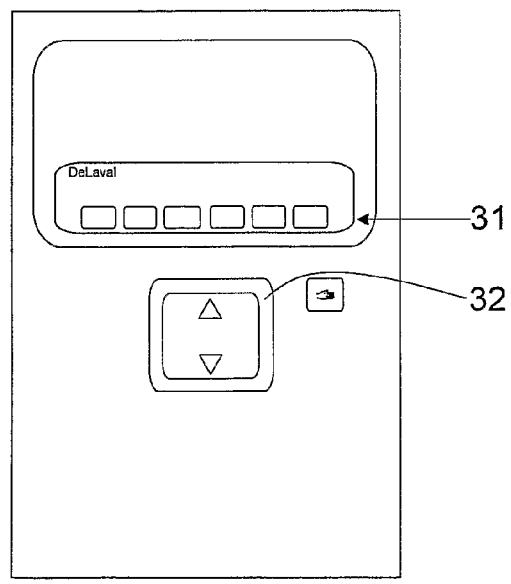
FIG. 3 is a schematic view of a terminal unit of a first kind as being included in the inventive arrangement of FIG. 1.
Figure 4:
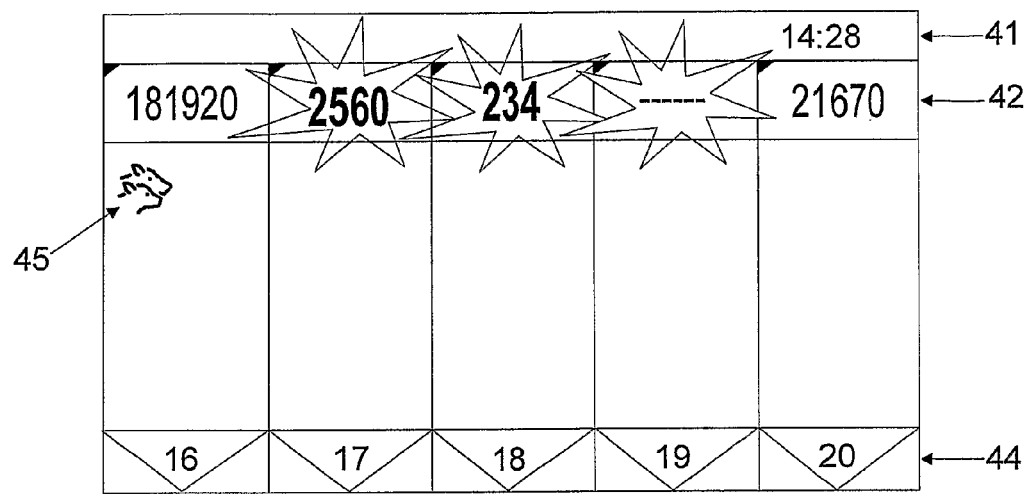
Figure 5:
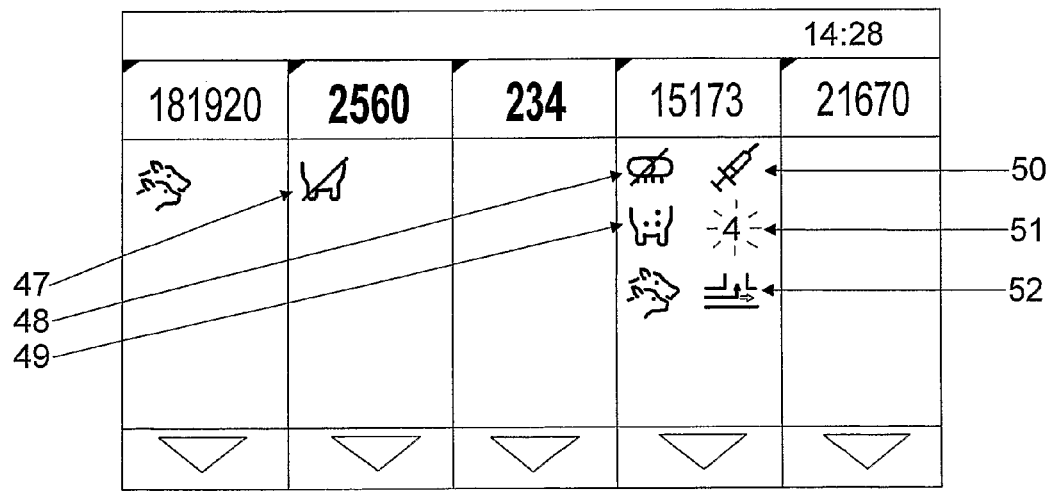

In FIG. 3, a schematic view of a terminal unit of a first kind is shown. Various status symbols are shown at 31, whereas an illuminated button is shown at 32.

Preferably, each of the terminal devices 11 of the first kind comprises means for indicating visually, such as e.g. by means of a fixed or blinking light, whether the cow present at the milking position, at which the output device is located, belongs to the cow(s) having the longest expected milking time(s).

Alternatively, instead of having the terminal units 11 of the first kind to indicate at which milking positions cows should have teat cups attached to their teats first, the portable device 17 may be provided to communicate this information verbally to the operator.

In order to further reduce the time the cows stay at the milking positions, various activities may be performed automatically and very early in the milking process, i.e. before the operator 15 enters the milking system. Examples of such activities include to start the vacuum pump used as a vacuum source, to perform pre-rinsing of the milking system, to perform various activities with respect to cleaning, to have the cows entered into the milking positions or at least into a gathering area, to switch valve(s) to obtain milking vacuum, and to move the teat cups into a position close to where the teats of the cows are or will be located.

If cows kick off teat cups or teat cups are not appropriately attached during the attachment of the teat cups, there may arise a situation where cows, which have not been milked out or have not been milked at all, are allowed to leave the milking system. To remedy such problem, the terminal units 11 of the first kind may have visual alarms, e.g. a red blinking light, or sound alarms to draw the attention of the operator in cases where a cow has not been milked correctly. Such circumstance may be discovered by comparing the actual milk yield with an expected milk yield. Alternatively, or additionally, the gates of the milking system may be controlled so that cows that are not milked (or all cows in the milking system) are not allowed to leave the milking system until these unmilked cows have been milked or until at least the operator is notified and has taken some action.

The processing and control device 10 connected to the milking system may be provided or supplied with instructions on actions to be taken with regard to the milking of the cows by the milking system, wherein the processing and control comprises processing means for automatically processing the instructions and for automatically selecting a subset of the instructions, and transmitting means for automatically transmitting the subset of the instructions wirelessly. The receiver of the portable device 17 is in turn provided for receiving the transmitted subset of the instructions wirelessly and the outputting means the portable device 17 is provided for outputting the subset of the instructions, preferably verbally, to the operator. Hence, the operator may receive selected instructions only, e.g. instructions of greater importance.

Preferably, each of the actions to be taken by the operator has a priority, and the processing and control device 10 is provided for automatically processing the instructions and for automatically selecting the subset of the instructions based on the priorities of the actions.

Alternatively or additionally, each of the actions to be taken by the operator has a degree of complexity, and the processing means is provided for automatically processing the instructions and for automatically selecting the subset of the instructions based on the degrees of complexity of the actions.

Further, the instructions may comprise identifications of the milking positions, at which the corresponding actions are to be taken.

The instructions may e.g. include:
(i) instructions on attachment and/or detachment of teat cups at identified milking positions;
(ii) instructions on connection of teat cups to vacuum and/or disconnection of teat cups from vacuum; and
(iii) instructions on checking of cows due to abnormal progress of the milking.

The processing and control device 10 may be responsible for gathering and processing information of the milking of the cows. Further, a module 10a of the processing and control device 10 is provided for automatically establishing, for each of the cows, a phase of the milking of the cow. Another module 10b is provided for automatically selecting, for each of the terminal units of the first 11 and/or second 13 kind, portions of the information of the milking of the cows to be displayed by the terminal unit 11, 13 based on the established phases of the milking of the cows. A yet another module 10c is provided for automatically transmitting, for each of the terminal units of the first 11 and/or second 13 kind, the selected portions of the information of the milking of the cows to the terminal unit 11, 13.

Finally, each of the terminal units of the first 11 and/or second 13 kind is provided for automatically outputting the selected portions of the information of the milking of the cows as received from the transmitting module 10c of the processing and control device 10.

Advantageously, the selection module 10b is provided for selecting, for each of the terminal units 13 of the second kind, different portions of the information of the milking of the cows to be displayed by the terminal unit 13 of the second kind during different phases of the milking of the cows.

The different phases may comprise an identification phase, a teat cup attachment phase, a stimulation phase, a milking phase, and a post-milking phase.

Alternatively or additionally, the different portions of the information of the milking of the cows to be displayed by the terminal unit 13 of the second kind during different phases of the milking of the cows may be communicated to the operator 15 via the portable terminal unit 17. To this end, the portable terminal unit comprises a position indicator device for indicating a position of the portable terminal unit 17, and means for automatically finding a group P1-P4, P5-P8, . . . of several adjacent ones of the milking positions that are in immediate proximity of the portable terminal unit 17 based on the indicated position of the portable terminal unit 17. Further, the portable terminal unit 17 comprises means for automatically displaying the different portions of the information of the milking of cows present at the group P1-P4, P5-P8, . . . of several adjacent ones of the milking positions that are in immediate proximity of the portable terminal unit 17.

FIGS. 4-7 are schematic views of the terminal unit 13 of the second kind during the above different phases of the milking. The display of the terminal unit 13 of the second kind has in the identification and stimulation phases four different fields: a general information field 41, a cow number field 42, a reminder field 43, and a soft key field 44. In the milking and post-milking phases the display has a fifth field: milking data field 60. Each of the fields except the general information field 41 has separate sub-fields for each of the milking positions P1, P2, P3, P4 of the group of milking positions P1-P4.

The general field 41 may provide information such as date and time in all phases.

The cow number field 42 identifies the cow present at the milking position. In the identification phase information of verified, unverified, and missing identities of cows are found. Verified cows are shown by fixedly indicated number (i.e. 181920 and 21670), unverified cows are shown by blinking number (i.e. 2560 and 234), and missing identities are shown by blinking dashed lines (i.e. ------). If not all identities have been verified, the operator 15 verifies the missing identities manually before next phase is entered. In all other phases this field shows cow identities.

The reminder field 43 shows by symbols various reminders supporting the operator 15 during the different phases. An example of different reminders with reference to the indicated reference numerals in FIGS. 4-7 are listed below.
45 the group to which the cow belongs
47 the cow should not be milked
48 the milk from the cow is to be diverted
49 only some of the udder quarters should be milked
50 the cow should be treated
51 cow specific information, e.g. information regarding the teat cup kick-off tendency of the cow
52 the cow should be screened out
74 the cow has low milk yield The milking data field 60 may in the milking phase give updated information on the milk yield during milking, both graphically 61 compared to an expected milk yield, and by FIG. 62. In the post-milking phase, the field may additionally indicate that the milking of the cow present at the milking position in question has been terminated by an underscored 73 milk yield figure.

During milking, instead of indicating the milk yield and expected milk yield, the milk flow and expected maximum milk flow may be indicated. Still alternatively, the milking time and expected milking time may be indicated. Yet alternatively, any combination of the above may be indicated.

The soft key field 44 provides an identification of the milking position in question. By touching this identification, the display is shifted to another mode showing detailed information regarding the milking and other activities at this milking position only.

The processing and control device 10 may be provided for gathering and processing information of the milking of the cows. Further, a module 10d of the processing and control device 10 is provided for receiving a user identity from the operator 15.

Another module 10e of the processing and control device 10 is provided for retrieving a user specific setting based on the received user identity. The user specific setting defines user specific information, instructions, operations and/or alarms regarding the milking of the cows, regarding the handling of the milking animals, or regarding the milking system. Additionally, the user specific setting may define a user specific manner of communicating and/or displaying information of the milking of the cows.

The transmitting module 10c of the processing and control device 10 is provided for transmitting the information, instructions, operations and/or alarms regarding the milking of the cows, regarding the handling of the milking animals, or regarding the milking system to the terminal units of the first 11 and/or second 13 kind as defined by the retrieved user specific setting. Finally, the terminal units of the first 11 and/or second 13 kind are provided for automatically outputting the information, instructions, operations and/or alarms regarding the milking of the cows, regarding the handling of the milking animals, or regarding the milking system as received from the transmitting module 10c of the processing and control device 10.

An automatic arrangement is thereby provided, by which user specific settings for the terminal devices can automatically be loaded when the operator, identifies him/herself for the milking system. By automatically loading the user specific settings the operator may easily receive the information and/or instructions he/she wants, needs, requires, or is requested to, by a quick glimpse at the terminal devices. The operator should not only obtain the information he/she needs by looking at the terminals, but should also obtain the information in the form, e.g. graphical or alphanumerical, he/she wants to. The visual communication could be accompanied by oral or other messages.

The arrangement may be used to display information or instructions based on the operator's personal preferences or based on the operator's knowledge and skills. The operation of the milking system may be logged together with the identity of the operator and these data could be correlated to automatically determine the experience and knowledge of each of the operators of the milking system. As a final point, the information and/or instructions given to the operator during milking can be automatically determined based on the determination of the experience and knowledge of the operator identified prior to the milking.

Further, information and/or instructions can be manually determined by a dairy farmer, manager, supervisor, or the like, depending on the user identity. The manager may send user specific information and/or instructions at particular points of time depending on the experience and knowledge of the operator identified prior to the milking.

A variation of the concept of user settings comprises the module 10d of the processing and control device 10 for receiving a user identity from the operator 15. The module 10e of the processing and control device 10 retrieves a user specific setting based on the received user identity. Here, the user specific setting defines a user specific vertical position of the vertically adjustable floor 19. A control module 1 of is provided for controlling the vertical position of the vertically adjustable floor 19 in response to the retrieved user specific setting. Thereby the operator is liberated from such a simple operation as adjusting the floor, and can thus concentrate on other issues of greater importance.

Other parameters regarding the milking system and/or the environment in which the operator is present, such as for instance lighting parameters, can be automatically altered or adjusted depending on a received user identity and a specific setting for that operator.

While the invention has been described with reference to particular embodiments thereof it shall not be restricted to such embodiments. The scope of the invention is set by the appended patent claims.

The invention claimed is:

1. An arrangement in a milking system for simultaneous milking of a plurality of milking animals, said milking system comprising a plurality of milking positions and an arrangement provided for establishing identities of and expected milking times for said milking animals, wherein each of the milking positions is provided with teat cups, which are attached to the teats of a milking animal and are connected to a source of vacuum to milk the milking animal, wherein:

a processing and control device to determine a milking position, at which the milking animal having the longest expected milking time is present, based on said established identities and expected milking times; and a device provided for performing an action with respect to said milking system in response to said determination, wherein said device for performing an action with respect to said milking system is a robot arm arrangement provided for attaching teat cups to the teats of said milking animal or animals having the longest expected milking time or times first, to thereby enable for the milking system to start milking the milking animal or animals having the longest expected milking time or times first, and said processing and control device to calculate an order, in which the milking animals present at the milking positions should have teat cups attached to their teats, based on the established identities and expected milking times; and said device for performing an action is provided for performing an action with respect to said milking system in response to said calculated order.

2. The arrangement of claim 1 wherein said processing and control device to determine several milking positions, at which the milking animals having the longest expected milking times are present, based on said established identities and expected milking times; and said device for performing an action is provided for performing an action with respect to said milking system in response to said determination of said several milking positions.

3. The arrangement of claim 2 wherein said processing and control device determined several milking positions, the number of which being dependent on the distribution of expected milking times among the milking animals present at the milking positions.

4. The arrangement of claim 2 wherein said processing and control device determines several milking positions, the number of which being dependent on the locations of the milking positions, at which the milking animals having the longest expected milking times are present.

5. The arrangement of claim 1 wherein said device for performing an action with respect to said milking system further comprises an output arrangement provided for outputting prior to the teat cups are attached to the teats of the milking animals present at the milking positions an indication of the milking position or positions, at which the milking animal or animals having the longest expected milking time or times is/are present.

6. The arrangement of claim 5 wherein said output arrangement comprises an output device located at each of said milking positions; and each of said output devices is adapted to indicate whether the milking animal present at the milking position, at which the output device is located, belongs to said milking animal or animals having the longest expected milking time or times.

7. The arrangement of claim 6 wherein each of said output devices comprises means for indicating visually, such as e.g. by means of a fixed or blinking light, whether the milking animal present at the milking position, at which the output device is located, belongs to the milking animal or animals having the longest expected milking time or times.

8. A method in a milking system for simultaneous milking of a plurality of milking animals at a plurality of milking positions, wherein identities of and expected milking times for said milking animals are established; wherein teat cups are attached to the teats of said milking animals and are connected to a source of vacuum to milk said milking animals; and wherein said method comprises:

determining a milking position, at which the milking animal having the longest expected milking time is present, based on said established identities and expected milking times;

performing an action with respect to said milking system in response to said determination;

attaching teat cups to the teats of said milking animal or animals having the longest expected milking time or times first, to thereby enable the milking system to start milking the milking animal or animals having the longest expected milking time or times first; and calculating an order, in which the milking animals present at the milking positions should have teat cups attached to their teats, based on the established identities and expected milking times; wherein the action is performed with respect to said milking system in response to said calculated order.

* * * * *

UNITED STATES PATENT AND TRADEMARK OFFICE
CERTIFICATE OF CORRECTION

PATENT NO. : 7,992,519 B2  Page 1 of 1
APPLICATION NO. : 12/311469
DATED : August 9, 2011
INVENTOR(S) : Odeberg et al.

It is certified that error appears in the above-identified patent and that said Letters Patent is hereby corrected as shown below:

On title page

Item (30) Foreign Application Priority Data should read as:

October 23, 2006  (SE) ....................0602219-8

Signed and Sealed this
Thirty-first Day of January, 2012

David J. Kappos
*Director of the United States Patent and Trademark Office*